(12) United States Patent
Bingham et al.

(10) Patent No.: US 8,354,651 B2
(45) Date of Patent: Jan. 15, 2013

(54) POSITRON EMISSION IMAGING DEVICE AND METHOD OF USING THE SAME

(75) Inventors: Philip R. Bingham, Knoxville, TN (US); James Allen Mullens, Farragut, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 335 days.

(21) Appl. No.: 12/827,402

(22) Filed: Jun. 30, 2010

(65) Prior Publication Data

US 2012/0001064 A1 Jan. 5, 2012

(51) Int. Cl.
*G01T 1/00* (2006.01)
(52) U.S. Cl. ...................................... 250/394
(58) Field of Classification Search ............... 250/394
See application file for complete search history.

(56) References Cited

U.S. PATENT DOCUMENTS

| | | | |
|---|---|---|---|
| 4,453,827 A | 6/1984 | Taboada | |
| 4,701,006 A | 10/1987 | Perlmutter | |
| 5,076,993 A * | 12/1991 | Sawa et al. | 376/159 |
| 6,760,134 B1 | 7/2004 | Schilling | |
| 6,809,845 B1 | 10/2004 | Kim | |
| 6,943,924 B2 | 9/2005 | Marquet | |
| 7,127,109 B1 | 10/2006 | Kim | |
| 7,312,875 B2 | 12/2007 | Hanson | |
| 7,364,296 B2 | 4/2008 | Miller | |
| 2007/0241283 A1* | 10/2007 | Chu et al. | 250/358.1 |
| 2010/0231895 A1 | 9/2010 | Mann | |
| 2010/0231896 A1 | 9/2010 | Mann | |
| 2010/0231918 A1 | 9/2010 | Mann | |

OTHER PUBLICATIONS

Bachim, B. L. et al., "Microinterferometric optical phase tomography for measuring small, asymmetric refractive-index differences in the profiles of optical fibers and fiber devices," Applied Optics, vol. 44, No. 3, 2005, pp. 316-327.
Beuthan, J. et al., "The spatial variation of the refractive index in biological cells," Phys. Med. Biol., vol. 41,1996, pp. 369-382.
Charriere, F. et al., "Living specimen tomography by digital holographic microscopy: morphometry of testate amoeba," Optics Express, vol. 14, No. 16,2006, pp. 7005-7013.
Choi, W. et al., "Extended depth of focus in tomographic phase microscopy using a propogation algorithm," Optics Letters, vol. 33, No. 2, 2008, pp. 171-173.

(Continued)

*Primary Examiner* — David Porta
*Assistant Examiner* — Hugh H Maupin
(74) *Attorney, Agent, or Firm* — Novak Druce + Quigg LLP (57) ABSTRACT

An imaging system and method of imaging are disclosed. The imaging system can include an external radiation source producing pairs of substantially simultaneous radiation emissions of a picturization emission and a verification emissions at an emission angle. The imaging system can also include a plurality of picturization sensors and at least one verification sensor for detecting the picturization and verification emissions, respectively. The imaging system also includes an object stage is arranged such that a picturization emission can pass through an object supported on said object stage before being detected by one of said plurality of picturization sensors. A coincidence system and a reconstruction system can also be included. The coincidence can receive information from the picturization and verification sensors and determine whether a detected picturization emission is direct radiation or scattered radiation. The reconstruction system can produce a multi-dimensional representation of an object imaged with the imaging system.

19 Claims, 5 Drawing Sheets

OTHER PUBLICATIONS

Cuche, E. et al., "Digital holography for quantitative phase-contrast imaging," Optics Letters, vol. 24, No. 5, 1999, pp. 291-293.

Ferraro, P. et al., "Quantitative phase-contrast microscopy by a lateral shear approach to digital holographic image reconstruction," Optics Letters, vol. 31, No. 10, 2006, pp. 1405-1407.

Ferraro, P. et al., "Quantitative Phase Microscopy of microstructures with extended measurement range and correction of chromatic aberrations by multiwavelength digital holography," Optics Express, vol. 15, No. 22, 2007, ~p. 14591-14600.

Goodman, J. W. et al., "Digital Image Formation form Electronically Detected Holograms," Applied Physics Letters, vol. 11, No. 3, 1967, pp. 77-79.

Grilli, S. et al., "Whole optical wavefields reconstruction by Digital Holography," Optics Express, vol. 9, No. 6, 2001, pp. 294-302.

Huntley, J. M. et al., "Temporal phase-unwrapping algorithm for automated interferogram analysis," Applied Optics, vol. 32, No. 17, 1993, pp. 3047-3052.

Iwai, H. et al., "Quantitative phase imaging using actively stabilized phase-shifting lowcoherence interferometry," Optics Letters, vol. 29, No. 20, 2004, pp. 2399-2401.

Kim, M. K. et al., Chapter 2, "Digital Holography and Multi-Wavelength Interference Techniques," Digital Holography and Three-Dimensional Display: Principles and Applications, Springer, New York, New York, Copyright 2006, pp. 51-72.

Kuhn, J. et al., "Real-time dual-wavelength digital holographic microscopy with a single hologram acquisition," Optics Express, vol. 15, No. 12, 2007, pp. 7231-7242.

Lo, C. F., "Surface normal guided method for two-dimensional phase unwrapping," Optik, vol. 113, No. 10, 2002, pp. 439-447.

Lue, N. et al., "Quantitative phase imaging of live cells using fast Fourier phase microscopy," Applied Optics, vol. 46, No. 10, 2007, pp. 1836-1842.

Mann, C. J. et al., "High-resolution quantitative phase-contrast microscopy by digital holography," Optics Express, vol. 13, No. 22, 2005, pp. 8693-8698.

Mann, C. J. et al., "Movies of cellular and sub-cellular motion by digital holographic microscopy," BioMedical Engineering OnLine, vol. 5, 2006, pp. 1-10.

Park, Y. et al., "Diffraction phase and fluorescence microscopy," Optics Express, vol. 14, No. 18, pp. 8263-8268.

Goodman, J. W., Introduction to Fourier Optics. 2ed. McGraw-Hili, New York, New York, Copyright 1996, 456 pages.

Schnars, U. et al., "Direct recording of holograms by a CCD target and numerical reconstruction," Applied Optics, vol. 33, No. 2, 1994, pp. 179-181.

Torok, P. et al., Optical Imaging and Microscopy: Techniques and Advanced Systems, Springer, Berlin, Germany, Copyright 2003, 405 pages.

Warnasooriya, N. et al., "LED-based multi-wavelength phase imaging interference microscopy," Optics Express, vol. 15, No. 15, 2007, pp. 9239-9247.

Yamauchi, T., "Low-coherent quantitative phase microscope for nanometer-scale measurement of living cells morphology," Optics Express, vol. 16, No. 16, 2008, pp. 12227-12238.

Yu, L. et al., "Improved tomographic imaging of wavelength scanning digital holographic microscopy by use of digital spectral shaping," Optics Express, vol. 15, No. 3, 2007, pp. 878-886.

Yu, L. et al., "Wavelength scanning digital interference holography for variable tomographic scanning," Optics Express, vol. 13, No. 15, 2005, pp. 5621-5627.

Boatner, L.A. et al.; "Single-Crystal CeCl3(CH3OH)4: A New Metal-Organic Cerium Chloride Methanol Adduck for Scintillator Applications," Applied Physics Letters, published online Dec. 16, 2008, pp. 244104-1 thru 1244104-3, vol. 93.

Chakoumakos, B.C. et al.; "Cerium Chloride—Methanol Adduck Crystals, CeCl3(CH3OH)4: Preparation, Crystallography, and Scintillation Properties," Crystal Growth and Design, Published on Web Jun. 5, 2008, pp. 2070-2072, vol. 8, No. 7.

Mann, C.J. et al., "Quantitative phase imaging by three-wavelength digital holography," Optics Express, vol. 16, No. 13, 2008, pp. 9753-9764.

* cited by examiner

POSITRON EMISSION IMAGING DEVICE AND METHOD OF USING THE SAME

STATEMENT REGARDING FEDERALLY SPONSORED RESEARCH OR DEVELOPMENT

The United States Government has rights in this invention pursuant to Contract No. DE-AC05-00OR22725 between the United States Department of Energy and UT-Battelle, LLC.

FIELD OF THE INVENTION

This disclosure relates to the field of positron emission imaging.

BACKGROUND OF THE INVENTION

It is often desirable to inspect an object or a material with penetrating radiation in order to assess the contents of the object or to assess the molecular properties of the material. Existing radiographic inspection systems often have difficulty in distinguishing useful signals from noise generated by scatters, or by nearby radiological articles, or by background radiation. What are needed therefore are improved systems for radiographic analysis of objects and materials.

SUMMARY OF THE INVENTION

An imaging system comprising an external radiation source that produces pairs of substantially simultaneous radiation emissions is disclosed. Each pair of substantially simultaneous radiation emissions comprises a picturization emission and a verification emission emitted at a known emission angle with respect to each other. The imaging system can include a plurality of picturization sensors capable of detecting the picturization emissions and at least one verification sensor capable of detecting the verification emissions. An object stage for supporting an object to be imaged can also be included, whereby at least a portion of the supported object is located between the external radiation source and at least one picturization sensor. The object stage can be arranged such that a picturization emission can pass through an object supported on the object stage before being detected by one of the plurality of picturization sensors.

The imaging system can include a coincidence system in communication with the plurality of picturization sensors and the at least one verification sensor. The coincidence system can classify each detected picturization emission as direct radiation if the detected picturization emission is part of a pair of substantially simultaneous radiation emissions having a coincident relationship and as scattered radiation if the pair of substantially simultaneous radiation emissions does not have a coincident relationship. The coincident relationship can be a temporal coincident relationship, an angular coincident relationship, or both.

The imaging system can include a reconstruction system in communication with the coincidence system, where the reconstruction system comprises a processor and machine executable instructions for producing a multi-dimensional representation of an object that was imaged. The multi-dimensional representation of the object supported by the object stage can be 2-dimensional or 3-dimensional. The multi-dimensional representation can be produced without using the scattered radiation. The coincidence system and the reconstruction system can utilize the same or different hardware.

The external radiation source can be located between a portion of the plurality of picturization sensors and a portion of the at least one verification sensors. As used herein, an object is between a portion of a first reference object and a portion of a second reference object if any portion of the object is located along a line drawn between any point on the first reference object and any point on the second reference object.

The imaging system can include a plurality of external radiation sources, where each of external radiation sources is spatially separated from the other external radiation sources. The external radiation sources can be positron emitters. The plurality of external radiation sources can be arranged as part of a source ring encircling the object stage. The plurality of picturization sensors can be arranged in a sensor ring and the source ring can be disposed within the sensor ring.

The imaging system can include a motion stage for providing relative motion (i) between the plurality of external radiation sources and the object stage, and (ii) between the plurality of external radiation sources and the plurality of picturization sensors. Whether or not the imaging system includes a motion stage, a fixed spatial relationship can exist between each of the plurality of external radiation sources and at least one of the at least one verification sensors.

The plurality of picturization sensors, the at least one verification sensor, or both, can include pixelated sensors. The coincident relationship can be an angular coincident relationship, and both the plurality of picturization sensors and the at least one verification sensors comprise pixelated sensors.

A method of imaging is also disclosed. The method can include providing an external radiation source that produces pairs of substantially simultaneous radiation emissions. The picturization emission and verification emission can be detected and an object to be imaged can be located between the external radiation source and a picturization detector. A coincidence system can be provided for classifying each detected picturization emission as direct radiation if the detected picturization emission is part of a pair of substantially simultaneous radiation emissions having a coincident relationship and as scattered radiation otherwise. The method can also include providing a reconstruction system for producing a multi-dimensional representation of an object imaged with the imaging system; moving the external radiation source, the object stage and/or the picturization sensors relative to one another during the detecting step; or both. The method can include rotating the external radiation source around the object stage during the detecting step.

BRIEF DESCRIPTION OF THE DRAWINGS

A fuller understanding of the present invention and the features and benefits thereof will be obtained upon review of the following detailed description together with the accompanying drawings, in which.

For a better understanding of the present invention, together with other and further objects, advantages and capabilities thereof, reference is made to the following disclosure and appended claims in connection with the above-described drawings.

DETAILED DESCRIPTION OF THE INVENTION

In the following detailed description of the preferred examples, reference is made to the accompanying drawings, which form a part hereof, and within which are shown by way of illustration the practice of specific examples of systems for radiographic analysis. It is to be understood that other examples may be utilized, and that structural changes may be made and processes may vary in other examples within the scope of this disclosure.

Figure 1:
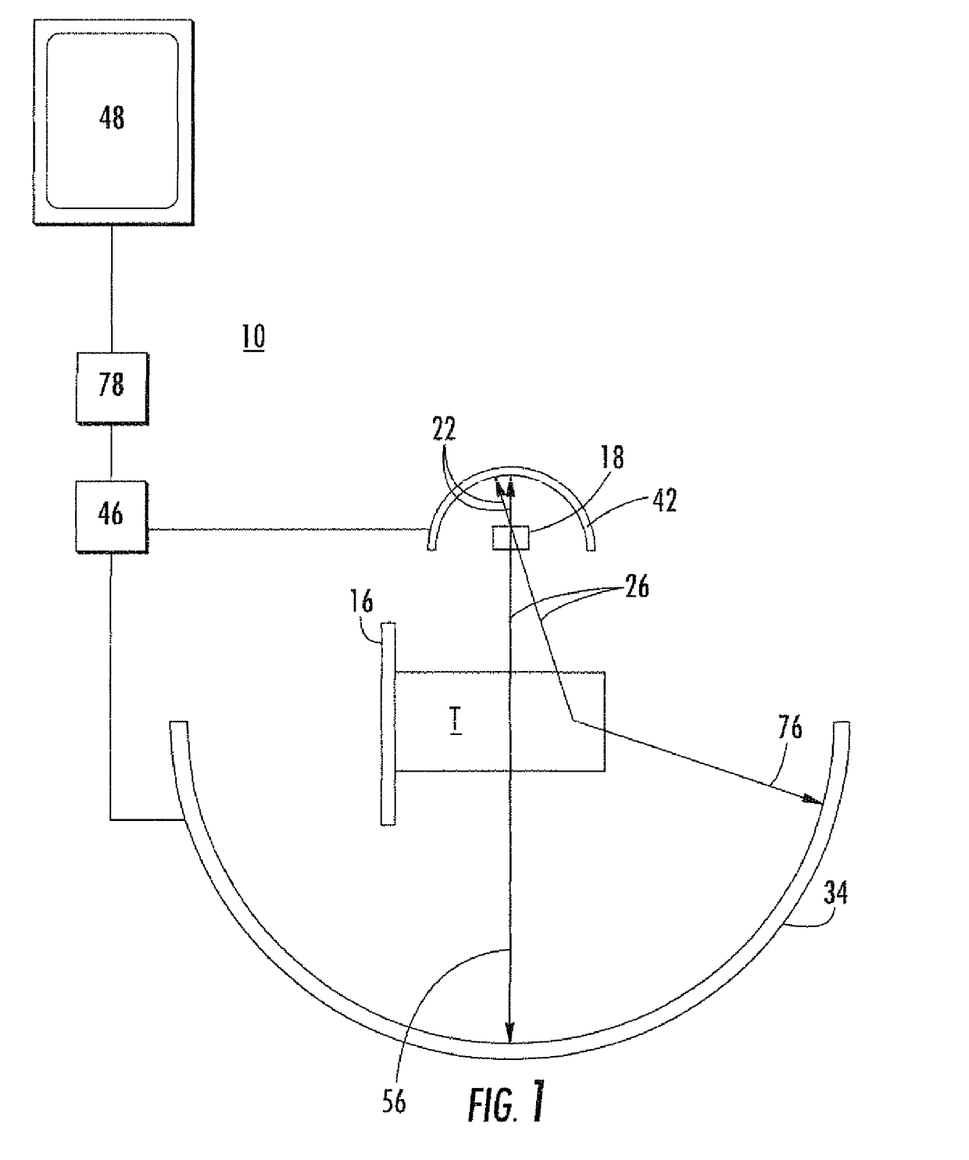
FIG. 1 shows a schematic of a single radiation source imaging system disclosed herein.
Figure 2:
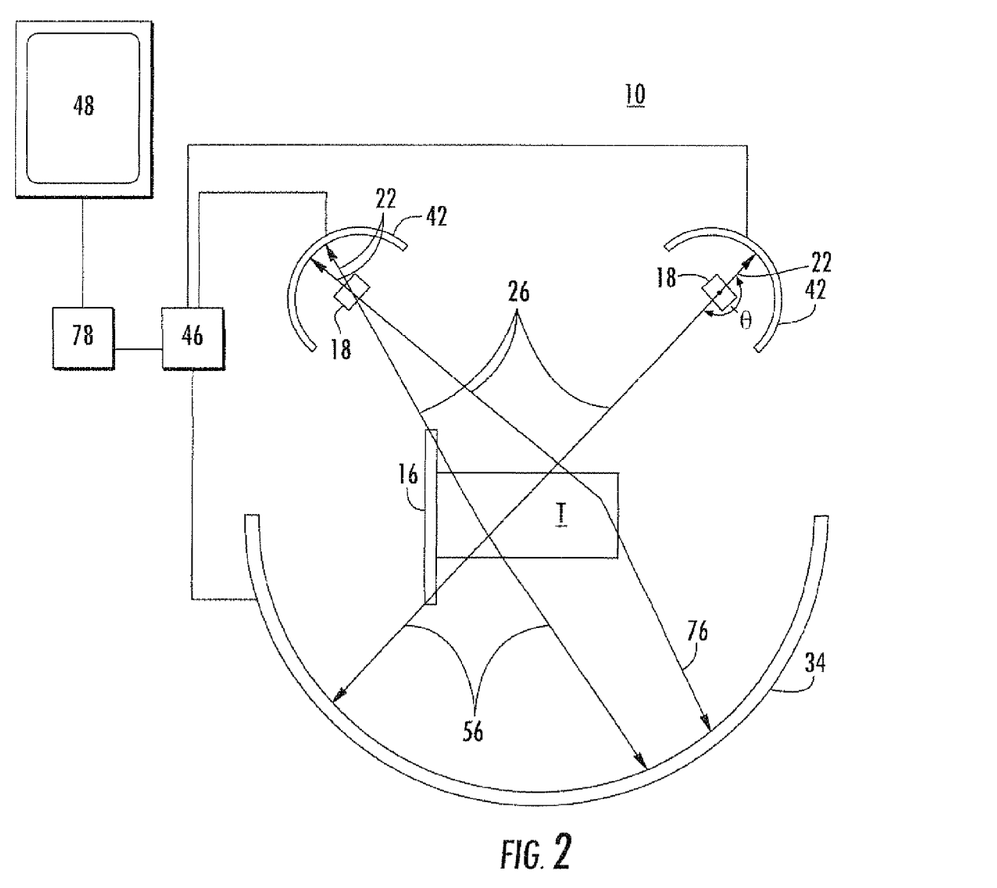
FIG. 2 shows a schematic of a multiple radiation source imaging system disclosed herein.

As shown in the Figures, an imaging system 10 comprising an external radiation source 18 that produces pairs of substantially simultaneous radiation emissions 22, 26 is disclosed. Each pair of substantially simultaneous radiation emissions 22, 26 includes a picturization emission 26 and a verification emission 22 emitted at a known emission angle, $\phi$ (e.g., approximately 180° for a positron emitter, such as shown in FIG. 2). The imaging system 10 can include a plurality of picturization sensors 34 capable of detecting the picturization emissions 26 and at least one verification sensor 42 capable of detecting the verification emissions 22. An object stage 16 for supporting an object to be imaged (T) can also be included, where the external radiation source 18, the object stage 16 and/or the picturization sensors 34 can be moved relative to one another (as shown in FIGS. 1-4).

The imaging system 10 can include a coincidence system 46 in communication with the plurality of picturization sensors 34 and the at least one verification sensor 42. The coincident system 46 can include a processor, such as a digital processor, and machine executable instructions for determining whether a detected picturization emission 26 is direct radiation 56 or scattered radiation 76. The coincidence system 46 is generally in electrical communication with the sensors 34, 42, such as through electrical wire, but can also be in optical communication with the sensors 34, 42, such as through optical cable. The coincidence system 46 classifies each detected picturization emission 26 as either direct radiation 56 or as scattered radiation 76. Each detected picturization emission 26 is classified as direct radiation 56 if the detected picturization emission 26 is part of a pair of substantially simultaneous radiation emissions having a coincident relationship and as scattered radiation 76 otherwise.

As used herein, "external radiation source" and "radiation source" are used interchangeably to refer to radiation sources that are external to the object being imaged during the imaging process. For example, a beverage containing a positron emitter that has been consumed by an individual is not an external radiation source. In contrast, one or more solid pellets containing a positron emitter coupled to the imaging system would be considered an external radiation source.

The coincident relationship can be a temporal coincident relationship, an angular coincident relationship, or both. As used herein, a "temporal coincident relationship" relates to time-gating of the substantially simultaneous radiation emissions to determine whether a particular picturization emission 26 is direct radiation 56 or scattered radiation 76. For example, the coincidence system 46 can compare the arrival time of a verification emission 22 with the arrival time of a picturization emission 26 to determine whether the picturization emission 26 is likely to be direct radiation 56 from a pair of substantially simultaneous radiation emissions arising from a particular external radiation source 18. In general, the arrival times of the emissions 22, 26 will be within a certain time range of one another if the picturization emission 26 is direct radiation 56. The particular time range will depend on the speed of the radiation (e.g., gamma ray) and the difference between (A) the distance between the external radiation source 18 and the verification sensor 42, and (B) the distance between the external radiation source 18 and the picturization sensor 34.

As used herein, an "angular coincident relationship" relates to positional-gating of the substantially simultaneous radiation emissions to determine whether a particular picturization emission 34 is direct radiation 56 or scattered radiation 76. For example, the coincidence system 46 can compare (i) the location where the verification emission 22 was detected (ii) the location of the external radiation source(s) 18 and, (iii) the location where the picturization emission 26 was detected to determine whether the locations form an angle that coincides with the emission angle associated with the emitter used for the external radiation source 18.

The plurality of picturization sensors 34, the at least one verification sensor 42, or both, can include pixelated sensors. It can be useful for both the plurality of picturization sensors 34 and the at least one verification sensor 42 to be pixelated when the coincident system 46 evaluates the pairs of substantially simultaneous radiation emissions for an angular coincident relationship. Thus, in some examples, the coincident relationship includes an angular coincident relationship and both the plurality of picturization sensors 34 and the at least one verification sensor 42 are pixelated. Of course, in other examples, the coincident relationship can include an angular relationship and neither of the plurality of picturization sensors 34 and at least one verification sensor 42 are pixelated. Similarly, in other examples, either the plurality of picturization sensors 34 or the at least one verification sensor 42 are unpixelated.

The imaging system 10 can include a reconstruction system 78 in communication with the coincidence system 46. The reconstruction system 78 can include a processor, such as a digital processor, and machine executable instructions for producing a multi-dimensional representation of an object to be imaged (T). The coincidence system 46 and the reconstruction system 78 can utilize the same or different hardware. For example, the machine executable instructions of the coincidence system 46 and of the reconstruction system 78 can be stored on the same computer readable storage and can be executed on the same processor. The processor for either or both of the coincidence system 46 and the reconstruction system 78 can be a digital processor. The imaging system 10 can include an output device 48 for displaying the multi-dimensional representation of the object (T).

The multi-dimensional representation of the object (T) on the object stage 16 can be 2-dimensional or 3-dimensional and can be displayed on an output device 48, such as a monitor, a handheld device, or printer. The multi-dimensional representation can be produced without using the scattered radiation 76, i.e., using only the direct radiation 56. Alternately, the multi-dimensional representation can be produced using only the scattered radiation 76 or using a combination of direct radiation 56 and scattered radiation 76.

Figure 3:
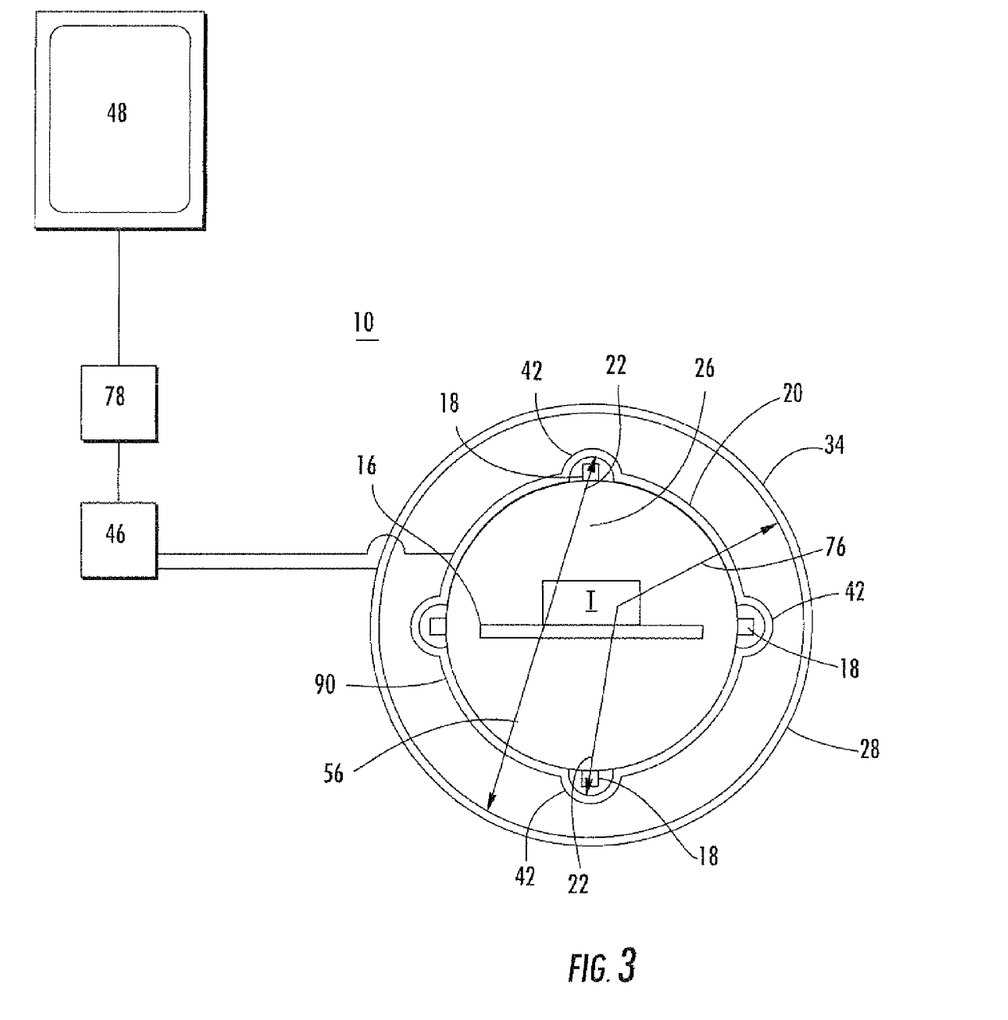
FIG. 3 shows a schematic of an imaging system, including a ring of radiation sources with dedicated verification sensors as disclosed herein.
Figure 5:
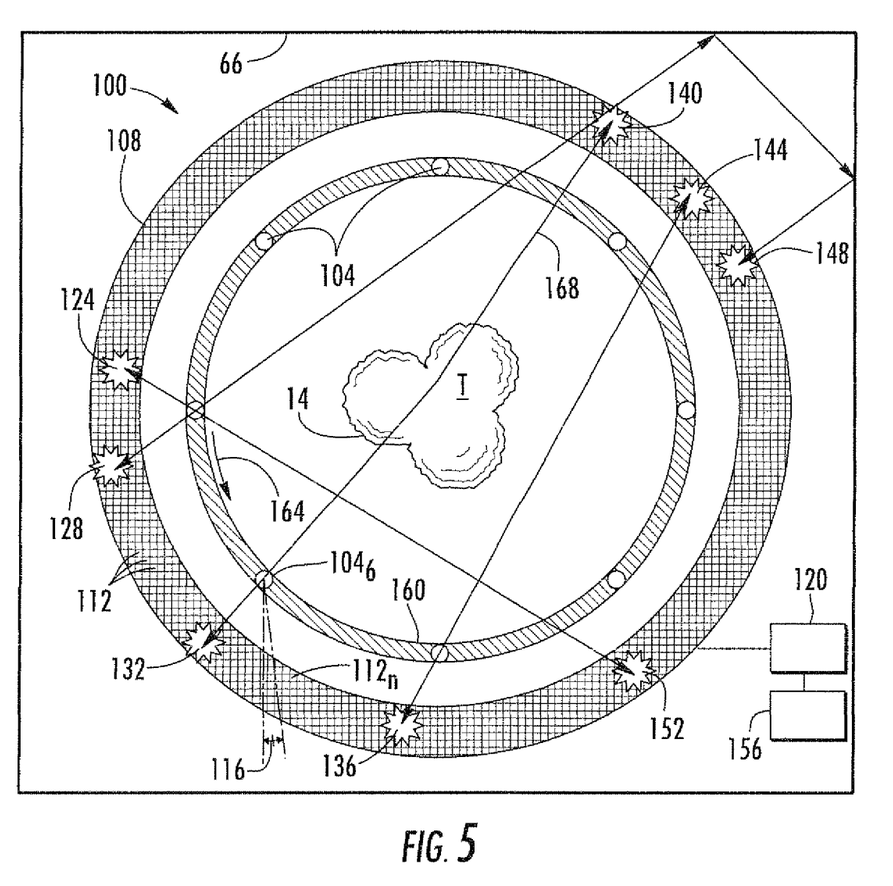
FIG. 5 shows a schematic of a multiple source radiation source imaging system as disclosed herein.

The external radiation source(s) 18 can be located between a portion of the plurality of picturization sensors 34 and a portion of the at least one verification sensors 42. As shown in FIGS. 2, 3 and 5, the imaging system 10 can include a plurality of external radiation sources 18, wherein each of external radiation sources 18 is spatially separated from the other external radiation sources 18. As shown in FIGS. 3 and 5, the plurality of external radiation sources 18 and verification sensors 42 can be arranged to form a source ring 20 encircling the object stage 16. The plurality of picturization sensors 34 can be arranged to form a sensor ring 28 encircling the object stage 16.

As shown in FIG. 3, the source ring 20 can have a smaller diameter than the sensor ring 28 and the source ring 20 can be disposed within the sensor ring 28. The source ring 20 and the sensor ring 28 can be tubular and arranged concentrically.

As used herein, two external radiation sources 18 are "spatially separated" if they are not directly in contact with one another and can be distinguished by the resolution of the imaging system, e.g., are monitored by separate verification sensors 42. For example, where a plurality of pellets containing positron emitters are packed into a container, the individual pellets would not be spatially separated because they would in contact with one another either directly or through a series of intermediate pellets. However, two containers filled with a plurality of pellets containing positron emitters would be spatially separated if the containers are separated by a distance that can be distinguished by the resolution of the imaging system. The external radiation source can be a positron emitter.

As shown in FIG. 3, the imaging system 10 can include a motion stage 90 for providing relative motion (i) between the plurality of external radiation 18 sources and the object stage 16, and (ii) between the plurality of external radiation sources 18 and the plurality of picturization sensors 34. Whether or not the imaging system 10 includes a motion stage 90, a fixed relationship can exist between each of the plurality of external radiation sources 18 and at least one verification sensor 42. For example, as shown in FIG. 3, when source ring 20 moves, the relative motion described above is produced while the position of the external radiation source 18 and verification sensors 42 remains fixed. Gathering picturization data while the source ring 20 moves is particularly useful for generating 3-dimensional tomographic representations. In one example, the source ring 20 can rotate. Of course, as described herein, 3-dimensional tomographic representations can be obtained using a variety of different methods that include introducing relative motion between the external radiation source 18, the object stage 16 and/or the picturization sensors 34 during the detecting phase of the imaging process and then reconstructing a plurality of virtual slices of the object (T).

A method of imaging is also disclosed. The method can include providing an external radiation source 18 that produces pairs of substantially simultaneous radiation emissions 22, 26. The picturization emission 26 and verification emission 22 can be detected and an object to be imaged (T) can be located between the external radiation source 18 and a detector 34 for detecting the picturization emission 26. A coincidence system 46 can be provided for classifying each detected picturization emission 26 as direct radiation 56 if the detected picturization emission 26 is part of a pair of substantially simultaneous radiation emissions 22, 26 having a coincident relationship and as scattered radiation 76 otherwise. The method can also include providing a reconstruction system 78 for producing a multi-dimensional representation of an object (T) imaged with the imaging system 10; moving the external radiation source, the object stage and/or the picturization sensors relative to one another during the detecting step; or both.

Figure 4:
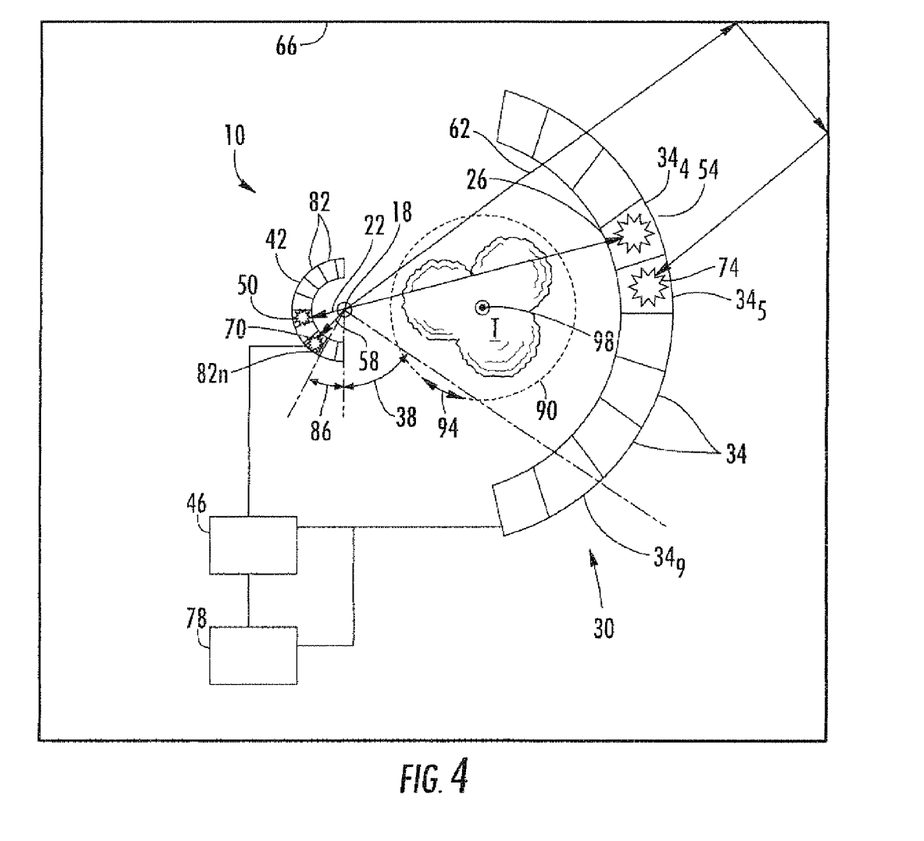
FIG. 4 shows a schematic of a single radiation source imaging system disclosed as herein.

FIG. 4 illustrates an example of a system 10 for radiographic analysis of a target object (T), which is depicted as a gear assembly. The system 10 has an external radiation source 18 that provides pairs of substantially simultaneous radiation emissions. For example, the external radiation source 18 may be a positron emitter such as $^{11}C$, $^{13}N$, $^{15}O$, $^{18}F$, $^{68}Ga$, or $^{82}Rb$ that spontaneously emits two substantially simultaneous gamma rays in directions that are emitted along paths that diverge by approximately 180°, e.g., 180°±2°. The external radiation source 18 is disposed external to the object (T) that is being analyzed. FIG. 4 illustrates a pair of such simultaneous emissions as traces 22 and 26. In the example described herein, the traces 22 and 26 represent gamma rays, but in other examples the external radiation source 18 may emit substantially simultaneous x-rays. The simultaneity and relative angularity of such emissions may be established by a radiological effect (such as the positron emission effect) or they may be established by instrumentation controls such shutters, windows, and modulators.

As shown in FIG. 4, the system 10 can include a radiographic radiation detector array 30 that has a plurality of picturization radiation detection elements 34 for detecting radiographic radiation events. The term "radiation detection element" is used herein to refer to a device that signals the same radiation detection event regardless of where the radiation intercepts the radiation detector element. The picturization radiation detection elements 34 are disposed at a plurality of projection angles such as projection angle 38 from the radiation source 18 to picturization radiation detection element $34_9$ (measured in this example to an arbitrarily vertical frame of reference). For simplicity of illustration, FIG. 4 depicts only ten picturization radiation detection elements 34, i.e., picturization sensors. In practice many more than ten picturization radiation detection elements 34 are generally employed. The external radiation source 18 is disposed at a known location with respect to the radiographic radiation detector array 30.

As seen in FIG. 4, the system 10 has a verification radiation detector 42 that detects verification radiation events. The terms "radiation detector," "radiation sensor" and "sensor" are used herein to refer to a device that comprises one or more elements for detection of radiation emitted by the external radiation source 18. The system 10 has a coincidence system 46 to monitor the picturization radiation detection elements 34 and the verification radiation detector 42 to determine whether, within a specified time window, a monitored radiographic radiation event is coincident with a monitored verification radiation event, and if so to identify the monitored radiographic radiation event as a coincident radiographic radiation event. For example, if the radiation source 18 emits two substantially simultaneous radiation emissions, with the first one along trace 22 and the second one along trace 26, the verification radiation detector 42 will detect a verification radiation event 50 and, in the examples shown herein, a short time later (because of the greater transmission distance) within a time interval that may be quite accurately estimated, a radiographic radiation event 54 is detected by picturization radiation detection element $34_4$. Consequently radiographic radiation event 54 is identified as a coincident radiographic radiation event.

FIG. 4 also illustrates a situation where the radiation source 18 has emitted two further substantially simultaneous radiation emissions with the first one along trace 58 and the second one along trace 62. In this case, the emission along trace 62 is scattered radiation because the emission trace 62 has been reflected by several portions of imaging system housing 66 after having gone over, under, or through the radiographic radiation detector array 30. The verification radiation detector 42 detects a verification radiation event 70, but when the radiation emission along trace 62 finally reaches picturization radiation detection element $34_5$ and registers as radiographic radiation event 74, it is after the specified time window, so the radiographic radiation event 74 is identified as scattered radiation, i.e., not a coincident radiation event, rather than direct radiation. This is very helpful because radiographic radiation event 74 has occurred at a spurious location on the radiographic radiation detector array 30 and is noise in the radiographic process.

The system 10 for radiographic analysis also includes a reconstruction system 78 that employs signal processors and digital data processors to associate the coincident radiographic radiation events (i.e., monitored radiographic radiation events that occur within a specified time window of a monitored verification radiation event) with the projection angle 38 of the picturization radiation detection element 34 that detected the coincident radiographic radiation event. The reconstruction system 78 uses digital data processors to analyze this information in view of the known location of the radiation source 18. The reconstruction system 78 may also acquire further signals from the radiographic radiation detector array 30 and/or the verification radiation detector 42 and/or system design parameter data and operational data to construct a two-dimensional (2-D) representation of the object (T). The 2-D multi-dimensional representation is typically an image analogous to a medical x-ray image. As will be described later herein, a three-dimensional (3-D) tomographic representation of the object (T) may be reconstructed (i) by providing relative rotation between the object (T) and the radiation source 18, the verification radiation detector 42, and the radiographic radiation detector array 30, (ii) by utilizing a plurality of external radiation sources 19, or (iii) both. A 3-D representation is typically constructed from a set of images analogous to medical tomographic images. Note that, as the term is used herein, the phrase "multi-dimensional representation" refers to both two-dimensional (2-D) and three-dimensional (3-D), e.g. tomographic, images produced using direct radiation, scattered radiation, or a combination of both.

As shown in FIG. 4, the verification radiation detector 42 may comprise a pixelated radiation sensor that has a plurality of radiation detection pixels 82 for detecting verification radiation events (e.g., verification radiation events 50 and 70). The radiation detection pixels 82 are disposed at a plurality of verification angles such as verification angle 86 from the radiation source 18 to pixel $82_n$. In such examples the coincidence system 46 is configured to monitor the picturization radiation detection elements 34 and the radiation detection pixels 82 to determine whether within a specified time window, a monitored radiographic radiation event (e.g., 54 or 74) is coincident with (meaning herein that it occurred within a specified time window of) a monitored verification radiation event, and if so to identify the monitored radiographic radiation event as a coincident radiographic radiation event. In such examples the coincidence system 46 is typically also configured to determine for each coincident radiographic radiation event whether an angle defined by (a) the projection angle (i.e., projection angle 38) of the picturization radiation detection element (e.g., $34_4$) that detected the coincident radiographic radiation event, and (b) the verification angle (i.e., 86) of the pixel (i.e., the specific pixel among the pixels 82) that detected the verification radiation event (e.g., 50) indicates the emission angle (e.g., 180° where a positron emitter is used as the external radiation source 18) of a pair of detected simultaneous radiation emission. If the coincident radiographic radiation event and the verification radiation event are indicative of the expected emission angle then such coincident radiation event is identified as a non-scattered radiographic radiation event and if not such coincident radiation event is identified as a scattered radiographic radiation event.

In examples where the verification radiation detector(s) 42 are pixelated, the system 10 may incorporate a reconstruction system 78 that associates the non-scattered radiographic radiation events with the projection angle (i.e., projection angle 38) of the picturization radiation detection element (e.g., $34_4$) that detected the non-scattered radiographic radiation event and the reconstruction system 78 may construct a multi-dimensional representation of the object.

Also in examples where the verification radiation detector 42 is a pixelated radiation detector, the system 10 may include a reconstruction system 78 that associates the scattered radiographic radiation events with the angles defined by (a) the projection angle (i.e., projection angle 38) of the picturization radiation detection element (e.g., $34_4$) that detected the coincident radiographic radiation event, and (b) the verification angle (i.e., 86) of the pixel that detected the verification radiation event (e.g., 50) and (c) the emission angle (180° in this example) to assess scatter produced by the object. The scatter assessment may provide a multi-dimensional representation of the scatter, or a graphical representation of the scatter (such as a histogram), or other analytical data.

Some examples of the system 10 for radiographic analysis may employ a motion stage 90 to provide relative motion between the radiation source 18/the verification radiation detector 42/the radiographic radiation detector array 30 and the object (T). For example, the motion stage 90 may hold the radiation source 18, the verification radiation detector 42, and the radiographic radiation detector array 30 all in a fixed spatial location and the motion stage 90 may rotate the object (T) in one or both of the directions 94 around an axis of rotation 98. Alternately the motion stage 90 may hold the object (T) in a fixed spatial location and rotate the radiation source 18, the verification radiation detector 42, and the radiographic radiation detector array 30 all in one or both of the directions 94 around the axis of rotation 98. In a further alternate configuration the motion stage 90 may rotate the object (T) in one of the directions 94 and rotate the radiation source 18, the verification radiation detector 42, and the radiographic radiation detector array 30 all in the other of the directions 94 around the axis of rotation 98. Such relative motion may be used to establish different projection angles for reconstruction of a 3-D image of the object (T). For such 3-D reconstructions the motion stage 90 provides data regarding the angular orientation of the object (T) with respect to the radiation source 18, the verification radiation detector 42, and the radiographic radiation detector array 30 to the reconstruction system 78.

It is to be noted that in some examples the radiographic radiation detector array 30 may be replaced with a pixelated radiation sensor having a plurality of radiation detection pixels. The terms "radiation sensor" or "sensor" as used herein to refer to a device that is either a radiation detection pixel or a radiation detection element. The distinction between a radiation detection pixel and a radiation detection element, as the terms are used herein, is that a radiation detector element is a radiation sensor (perhaps having dimensions of about 25×25 mm) that is configured to provide the same radiation detection signal regardless of where radiation impacts the surface of the radiation detector element. In contrast, a radiation detection pixel is just one section (e.g. 6×6 mm) of a larger radiation sensor that is configured to provide spatial identification (by pixel) of where radiation impacts the sensor. As an example, a radiation sensor might have a face of size 50×50 mm and be subdivided into 8×8 pixels (each about 6×6 mm). This radiation sensor might be configured to provide the same radiation detection signal regardless of where radiation impacts the surface of the radiation detector element, and in such a configuration this radiation sensor is being used as a radiation detection element. Alternately this radiation sensor might be configured to provide identification of which of the 64 pixels detected the radiation. That is, this 50×50 mm detector has been made position sensitive—it identifies which pixel(s) was (were) impacted by the radiation. In this configuration this radiation sensor is referred to as a pixelated radiation sensor. The specific technique used to obtain this position sensitive result varies with the detector design & signal processing.

Pixelated radiation sensors may be one-dimensional (i.e., comprise a 1×n array of pixels, where n is greater than 1) or may be two-dimensional (i.e., comprise an m×n array of pixels, where m and n are greater than 1). It should be noted that the radiographic radiation detector array 30 includes a plurality of picturization radiation detection elements 34 and is also position sensitive. The choice of whether to employ a pixelated radiation sensor or a plurality of radiation detection elements in an array depends upon the physical geometry of the system and the spatial resolution desired. Pixelated radiation sensors generally provide spatial information in a more straightforward, conventional manner than does an array of radiation detection elements. The term "position-indicating radiation sensor" is used herein to refer to either a pixelated radiation sensor or an array of radiation detection elements.

In some examples, the system 10 can include a plurality of radiation sources 18 and verification radiation detectors 42, with each radiation source 18 being associated with a verification radiation detector 42. Typically, but not necessarily, the plurality of radiation sources 18 and verification radiation detectors 42 are located radially equidistant from the radiographic radiation detector array 30.

The use of multiple pairs of radiation sources 18 and verification radiation detectors 42, such as those shown in FIGS. 2, 3 and 5, has a number of potential benefits. First, tomographic reconstruction requires multiple projection angles and that process can be slow depending on the required exposure times. By using multiple pairs of radiation sources 18 and verification radiation detectors 42 the process time may be drastically reduced because images from multiple projections may be acquired simultaneously. Second, for non-tomographic radiographic inspection processes it may be necessary to acquire several views in order to perform a proper inspection. One example is a dual view airport baggage scanner which provides two orthogonal views to improve detection. The use of two radiation sources 18 and two verification radiation detectors 42 would allow both projections to be taken at the same time. Third, in applications where an object is moving through an inspection system, two identical systems may be employed to provide a quicker exposure, thus allowing the object to move through the systems more quickly.

FIG. 5 illustrates a further example of a system 100 for radiographic analysis of an object (T), the gear assembly object of the example of FIG. 4. The system 100 uses a plurality of radiation sources 104 to provide pairs of substantially simultaneous radiation emissions. By using the plurality of radiation sources 104, radiographic information may be acquired simultaneously from multiple projection angles. In the example of FIG. 5 there are eight radiation sources 104 that are symmetrically disposed in a circular array. In some examples there may be more or less than eight radiation sources 104 and in some examples the radiation sources 104 may not be disposed symmetrically and in some examples the radiation sources 104 may not be disposed in a circular array.

In FIG. 5, there is a ring 108 of radiation sensors 112 for detecting radiation events. The radiation sensors 112 are preferably radiation detection pixels but in some examples the radiation sensors 112 may be radiation detection elements. The radiation sensors 112 are disposed outside the plurality of radiation sources 104 and at a plurality of incident angles such as incident angle 116 from radiation source $104_6$ to radiation sensor $112_n$ (measured in this example to an arbitrarily vertical frame of reference).

There is a coincidence system 120 in FIG. 5 to monitor the radiation sensors 112 to determine whether, within a specified time window, a first monitored radiation event (such as monitored radiation events 124, 128, 132 and 136) is coincident with (again, meaning herein that it that it occurred within a specified time window of) a second monitored radiation event (such as monitored radiation events 140, 144, 148, and 152), and if so to identify the second monitored radiation event as a coincident radiation event. For reasons explained with respect to the example of FIG. 4, the radiation events 140 and 144 and 152 of FIG. 5 are coincident radiation events, and radiation event 148 is not a coincident radiation event.

The system 100 of FIG. 5 further includes a reconstruction system 156 that uses information regarding the location of each of the radiation sensors 112 and that receives information from the coincidence system 120 and that may acquire further signals from the radiation sensors 112 and that may acquire other system design parameter and operational data to associate the coincident radiation events (e.g., radiation events 140, 144 and 152) with the incident angle 116 of the radiation sensor that detected the coincident radiation event to construct a multi-dimensional representation of the object (T). Because the system 100 includes a plurality of radiation sources 104 that provide a plurality of projection angles through the item (T), this multi-dimensional representation may be a tomographic representation.

In some examples, the radiation sources 104 are mounted in a motion stage such as ring 160 that moves, such as rotation in direction 164. Such examples are typically used to construct a three-dimensional representation of the object (T).

Some examples of system 100 may assess radiation scattering effects of the object (T). Scattering effects indicated how the radiation (e.g., gamma rays, x-rays) passes through the object. The radiation may pass through the object with no interaction and therefore experience no change in path direction, or the radiation may pass through the object and be scattered (i.e., the path of the radiation may be bent). For example, note that trace 168 has been slightly bent as it passes through the object (T). To detect such scattering, the coincidence system 120 may monitor the radiation sensors 112 to determine whether within a specified time window, a first monitored radiographic radiation event (such as radiation events 124, 128, 132, or 136) detected by a first radiation sensor is coincident with a second monitored verification radiation event (e.g., 140, 144, 148, or 152) detected by a second monitored radiation sensor, and if so to identify the second monitored radiation event as a coincident radiation event. In such examples the coincidence system 120 is typically also configured to determine for each coincident radiation event whether an angle defined by (a) a first incident angle 116 between (i) any of the radiation sources 104 evaluated sequentially and (ii) the first monitored radiation sensor and (b) a second incident angle between (iii) the radiation source evaluated sequentially and (iv) the second monitored radiation sensor indicates the emission angle of a detected simultaneous radiation emission. If for a coincident radiation event the angle defined by (a) the first incident angle 116 between (i) any of the radiation sources 104 evaluated sequentially and (ii) the first monitored radiation sensor and (b) the second incident angle between (iii) the radiation source evaluated sequentially and (iv) the second monitored radiation sensor indicates the emission angle of a detected simultaneous radiation emission then such coincident radiation event is identified as a direct radiographic radiation event. If, for a coincident radiation event, the angle defined by (a) the first incident angle 116 between (i) any of the radiation sources 104 evaluated sequentially and (ii) the first monitored radiation sensor and (b) the second incident angle between (iii) the radiation source evaluated sequentially and (iv) the second monitored radiation sensor does not correspond to the known emission angle of a detected simultaneous radiation emission then the potential coincident radiation event is identified as a scattered radiographic radiation event.

As shown in FIG. 5, the system 100 can include a reconstruction system 156 that associates the non-scattered radiographic radiation events, i.e., an event resulting from detection of direct radiation 56, with the incident angle of the second monitored radiation sensor to construct a multi-dimensional representation of the object. In such scattering detection examples of the system 100, the reconstruction system 156 may associate the scattered radiographic radiation events, i.e., scattered radiation 76, with the angles defined by (a) the first incident angle 116 between (i) the radiation source and (ii) the first monitored radiation sensor and (b) the second incident angle 116 between (iii) the radiation source evaluated sequentially and (iv) the second monitored radiation sensor, and (c) the emission angle in order to assess scatter produced by the object being imaged (T).

In summary, examples disclosed herein provide various systems for radiographic analysis of an object. The foregoing descriptions of examples have been presented for purposes of illustration and explanation. They are not intended to be exhaustive or to limit the examples to the precise forms disclosed. Obvious modifications or variations are possible in light of the above teachings. The examples are chosen and described in an effort to provide the best illustrations of principles and practical applications, and to thereby enable one of ordinary skill in the art to utilize the various examples as described and with various modifications as are suited to the particular use contemplated. AU such modifications and variations are within the scope of the appended claims when interpreted in accordance with the breadth to which they are fairly, legally, and equitably entitled.

We claim:

1. An imaging system comprising:
    an external radiation source, wherein said external radiation source comprises a positron emitter,
    said external radiation source producing pairs of substantially simultaneous radiation emissions,
    each pair of substantially simultaneous radiation emissions comprising a picturization emission and a verification emission emitted at an emission angle;
    a plurality of picturization sensors capable of detecting said picturization emissions;
    at least one verification sensor capable of detecting said verification emissions;
    an object stage, wherein said object stage is arranged such that a picturization emission can pass through an object supported on said object stage before being detected by one of said plurality of picturization sensors; and
    a coincidence system in communication with said plurality of picturization sensors and said at least one verification sensor, said coincidence system classifying each detected picturization emission that is part of a pair of radiation emissions detected within a predefined time window, as direct radiation if the pair of radiation emissions have a coincident relationship that meets a predefined condition, and as scattered radiation otherwise.

2. The imaging system according to claim 1, further comprising a reconstruction system in communication with said coincidence system, said reconstruction system comprising a processor and machine executable instructions for producing a multi-dimensional representation of an object imaged with said imaging system.

3. The imaging system according to claim 1, wherein said multi-dimensional representation is produced without using said scattered radiation.

4. The imaging system according to claim 1, wherein said external radiation source is located between a portion of said plurality of picturization sensors and a portion of said at least one verification sensors.

5. The imaging system according to claim 1, wherein said coincident relationship is selected from the group consisting of:
    (i) a temporal coincident relationship;
    (ii) an angular coincident relationship, and
    (iii) both.

6. The imaging system according to claim 1, wherein said imaging system comprises a plurality of said external radiation sources, wherein each of said external radiation sources is spatially separated from the other external radiation sources.

7. The imaging system according to claim 6, further comprising a motion stage for providing relative motion between the external radiation source, the object stage and/or the picturization sensors.

8. The imaging system according to claim 7, further comprising a reconstruction system comprising a processor and machine executable instructions for producing a 3-dimensional multi-dimensional representation using said direct radiation, scattered radiation, or both.

9. The imaging system according to claim 7, wherein a fixed spatial relationship exists between each of said plurality of external radiation sources and at least one of said at least one verification sensors.

10. The imaging system according to claim 6, wherein each of said plurality of external radiation sources is located between a portion of said plurality of picturization sensors and a portion of said at least one verification sensors.

11. The imaging system according to claim 10, further comprising a motion stage for providing relative motion between the external radiation source, the object stage and/or the picturization sensors.

12. The imaging system according to claim 6, wherein said plurality of external radiation sources are arranged in a source ring surrounding said object stage.

13. The imaging system according to claim 12, further comprising a motion stage for providing relative motion between the external radiation source, the object stage and/or the picturization sensors.

14. The imaging system according to claim 12, wherein said plurality of picturization sensors are arranged in a sensor ring and said source ring is disposed within said sensor ring.

15. The imaging system according to claim 1, wherein said plurality of picturization sensors, said at least one verification sensor, or both, comprise pixelated sensors.

16. The imaging system according to claim 1, wherein said coincident relationship comprises an angular coincident relationship, and wherein both said plurality of picturization sensors and said at least one verification sensors comprise pixelated sensors.

17. A method of imaging, comprising:

providing an external radiation source, wherein said external radiation source comprises a positron emitter, said external radiation source producing pairs of substantially simultaneous radiation emissions, each pair of substantially simultaneous radiation emissions comprising a picturization emission and a verification emission emitted as an emission angle;

detecting said picturization emission and said verification emission, wherein an object stage is provided and arranged such that a picturization emission can pass through an object supported on said object stage before being detected by one of said plurality of picturization sensors; and providing a coincidence system for classifying each detected picturization emission that is part of a pair of radiation emissions detected within a predefined time window, as direct radiation if the pair of radiation emissions have a coincident relationship that meets a predefined condition, and as scattered radiation otherwise.

18. The method according to claim 17, further comprising: providing a reconstruction system for producing a multi-dimensional representation of an object imaged with said imaging system.

19. The method according to claim 18, further comprising: moving the external radiation source, the object stage and/or the picturization sensors relative to one another during the detecting step.

* * * * *